US008059138B2

(12) United States Patent
Fujii et al.

(10) Patent No.: US 8,059,138 B2
(45) Date of Patent: Nov. 15, 2011

(54) IMAGE PROCESSING AND ARRANGING SYSTEM, IMAGE PROCESSING AND ARRANGING METHOD, AND COMPUTER READABLE MEDIUM FOR IMAGE PROCESSING AND ARRANGING

(75) Inventors: Koichi Fujii, Kanagawa (JP); Yuzuru Suzuki, Kanagawa (JP); Hiroyuki Kawano, Kanagawa (JP); Atsushi Itoh, Kanagawa (JP); Kunikazu Ueno, Kanagawa (JP); Natsumi Miyazawa, Kanagawa (JP); Shunsuke Kodaira, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1148 days.

(21) Appl. No.: 11/797,848

(22) Filed: May 8, 2007

(65) Prior Publication Data
US 2008/0079655 A1 Apr. 3, 2008

(30) Foreign Application Priority Data

Oct. 2, 2006 (JP) ................................. 2006-270371

(51) Int. Cl.
*G09G 5/00* (2006.01)
*G06F 17/00* (2006.01)
(52) U.S. Cl. ........ 345/636; 345/629; 345/634; 345/638; 715/243; 715/247; 715/253

(58) Field of Classification Search .................. 345/629, 345/634, 636, 638; 715/243, 247, 253
See application file for complete search history.

(56) References Cited

U.S. PATENT DOCUMENTS

| | | | |
|---|---|---|---|
| 2001/0041005 A1* | 11/2001 | Fujiwara | 382/181 |
| 2001/0056370 A1* | 12/2001 | Tafla | 705/14 |
| 2002/0075407 A1* | 6/2002 | Cohen-Solal | 348/565 |
| 2002/0089549 A1* | 7/2002 | Munro et al. | 345/835 |
| 2004/0109201 A1* | 6/2004 | Teraue | 358/1.18 |
| 2005/0177772 A1* | 8/2005 | Derks et al. | 714/25 |
| 2007/0047814 A1* | 3/2007 | Yamazaki | 382/176 |
| 2007/0061583 A1* | 3/2007 | Kanatsu et al. | 713/176 |
| 2009/0253113 A1* | 10/2009 | Tuve | 434/327 |

FOREIGN PATENT DOCUMENTS

| | | |
|---|---|---|
| JP | A 2001-188525 | 7/2001 |
| JP | A-2005-184582 | 7/2005 |

OTHER PUBLICATIONS

Japanese Patent Office, "Notification of Reason for Refusal for Japanese Patent Application No. 2006-270371 (with English translation)," dated Nov. 24, 2010, pp. 1-2 (pp. 1-3 for translation).

* cited by examiner

*Primary Examiner* — Jeffrey Chow
(74) *Attorney, Agent, or Firm* — Oliff & Berridge, PLC (57) ABSTRACT

An image processing system includes: a display that displays a still image and a moving image to move over the still image; a snapshot-image producing unit that produces the snapshot image of the moving image; and an arranging unit that arranges the snapshot image on the still image.

11 Claims, 9 Drawing Sheets

IMAGE PROCESSING AND ARRANGING SYSTEM, IMAGE PROCESSING AND ARRANGING METHOD, AND COMPUTER READABLE MEDIUM FOR IMAGE PROCESSING AND ARRANGING

CROSS-REFERENCE TO RELATED APPLICATION

This application is based on and claims priority under 35 USC §119 from Japanese Patent Application No. 2006-270371 filed Oct. 2, 2006.

BACKGROUND (i) Technical Field

The present invention relates to an image processing system, an image processing method, a computer readable medium for image processing and a computer data signal for image processing.

(ii) Related Art

As computer software, there is an application program adapted to reproduce a moving image while changing a reproduced point on a part of a still image of a document material or the like. Where desired to print out both a snapshot image of the moving image and the still image on the application software, there encounters a possible case that the moving image overlaps with a significant portion of the still image thus resulting in an undesirable print-out result.

SUMMARY

According to one aspect of the present invention, there is provided an image processing system including:

a display that displays a still image and a moving image to move over the still image;

a snapshot-image producing unit that produces the snapshot image of the moving image; and an arranging unit that arranges the snapshot image on the still image.

BRIEF DESCRIPTION OF THE DRAWINGS

Exemplary embodiments of the present invention will be described in detail based on the following figures, wherein.

DETAILED DESCRIPTION

Figure 1:
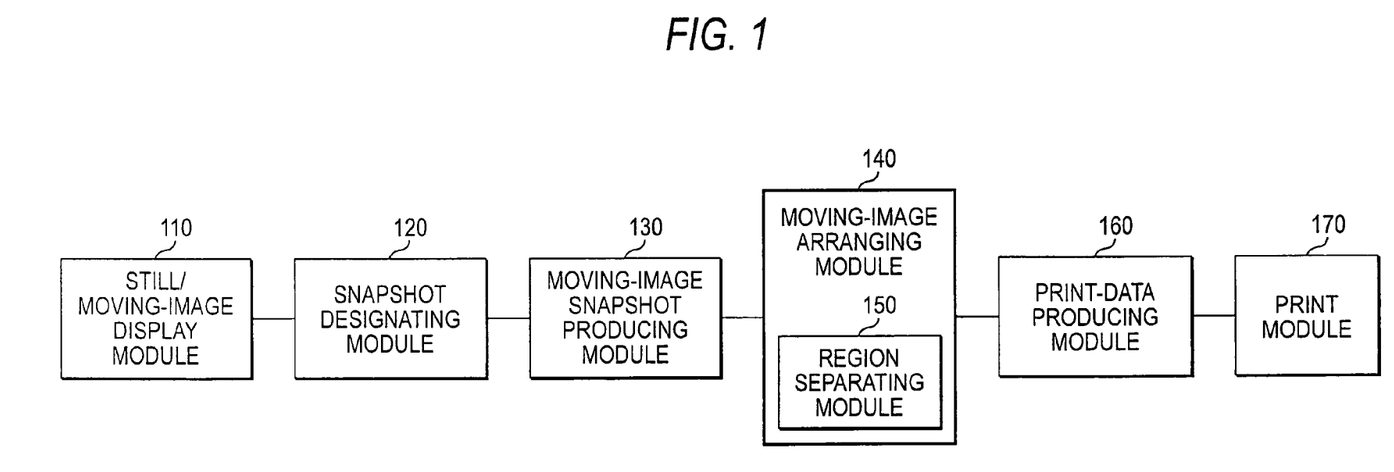
FIG. 1 shows a module configuration diagram of an exemplary embodiment of the invention.

Based upon the drawings, explanation will now be made below on an exemplary embodiment according to the present invention. FIG. 1 shows a conceptional view of a module configuration in an exemplary embodiment.

The term "module", generally, refers to a logically separable component, such as of software or hardware. Hence, the module in the embodiment includes not only a program module but also a module in a hardware configuration. The present embodiment, therefore, covers to explain a program, a system and a method. The modules correspond to functions in a one-to-one relationship. However, in setting up, one module may be configured with one program or otherwise plural modules may be configured by one program. Conversely, one module may be configured with plural programs. Meanwhile, the plural modules may be executed by one computer or otherwise one module may be executed by plural computers that are in a distributed or parallel environment. From now on, the term "connection" includes the meaning of logical connection in addition to physical connection.

Meanwhile, the system is configured with a connection of plural computers, hardware, devices and the like through a network, including a case to be realized by one computer.

From now on, explanations are based mainly on a document-material image as an example of a still image.

This embodiment includes a still/moving-image display module 110, a snapshot designating module 120, a moving-image snapshot producing module 130, a moving-image arranging module 140, a print-data producing module 160 and a print module 170, as shown in FIG. 1. The moving-image arranging module 140 may have a region-separating module 150 therein. The region-separating module 150 may be positioned as a pre-processing module for the moving-image arranging module 140. Namely, connection may be provided between the moving-image snapshot generation module 130 and the region-separating module 150, and between the region-separating module 150 and the moving-image arranging module 140.

The still/moving-image display module 110 is connected to the snapshot designating module 120, to display a still image and a moving image that moves over the still image. Specifically, it is given by an application program operating on a computer, to reproduce a moving image at a site changing on a part of a still image of a document material or the like. More specifically, it may be a display module that displays an explanatory text of a document material while moving an imitation image of a person or the like or makes an explanation thereof by speech or so in displaying the document material.

The snapshot designating module 120 is connected to the still/moving-image display module 110 and to the moving-image snapshot producing module 130, to designate a generation of a snapshot image of a moving image being displayed by the still/moving image display module 110 through user's operation. Namely, the operator is allowed to make an operation at a desired time for image printing while viewing a moving image being displayed by the still/moving-image display module 110. Base upon the operation, the snapshot designating module 120 makes a designation to produce a snapshot image. Incidentally, snapshot means to make the on-display-screen image directly into a file or to print same on the printer, being also called screen dump. Note that snapshot, in the embodiment, includes an image having only an instantaneous image as to a moving image, in addition to the on-display-screen image itself.

Operator's operation is to press a "Print Screen" button on a keyboard, for example. For a certain application program, another operation may be requested.

The moving-image snapshot generation module 130 is connected to the snapshot designating module 120 and to the moving-image arranging module, to produce a snapshot image to a moving image being displayed by the still/moving-image display module 110. Explaining it with use of the foregoing example, it generates a snapshot image to a moving image in the instant the operator pushed the print screen button.

The moving-image arranging module 140 is connected to the moving-image snapshot producing module 130 and to the print-data producing module 160, thus having the region-separating module 150. This arranges, on the still image, a snapshot image produced by the moving-image snapshot producing module 130.

The region-separating module 150 is provided in the moving-image arranging module 140, to separate an image into regions. The result of separation is delivered to the moving-image arranging module 140. Here, the image to handle may be one-sheet image or an image formed by plural pages. Meanwhile, the image to handle may be a still image like the foregoing or a still image containing a snapshot image to a moving image.

Regional separation may be by separating the region delimited by means of a blank, etc. from the image. Naturally, regional separation may be by another known method. The region is to be discriminated, in type, as a background region lying in the lowermost, a region including a character (hereinafter, referred to as a character region, wherein a table may be included), a region including a photograph (hereinafter, referred to as a photographic region), a region including a figure (hereinafter, referred to as a figure region, and the like. The type-based discrimination is made depending upon a position, in a feature space, of a character (size and form of a black-pixel cluster, black-pixel count in a given region, arrangement of black-pixel clusters, etc.) extracted out of a separated region. However, another known method is also applicable.

Meanwhile, the region-separating module 150 is also to extract a size of a character present in a character region. For example, it is satisfactory to make a measurement in terms of a rectangular regional size of black-pixel clusters arranged at a constant interval. However, another known method is also applicable.

Incidentally, the underlying region is a region free of descriptions of characters or the like in a document material, which is also referred as a blank region. Meanwhile, it is not limited to a white region but may be a colored region or a region depicted with a pattern or the like.

The region that is not a background region nor a character region (e.g. photographic region, figure region, etc.) is referred to as a picture region.

Meanwhile, the moving-image arranging module 140 may arrange the snapshot image on a still image, in accordance with a result of regional separation made by the region-separating module 150.

Furthermore, the moving-image arranging module 140 may be as in the following.

(1) The snapshot image is arranged in a background region where the snapshot image can be encompassed, out of underlying regions separated by the region-separating module 150. Namely, this is to arrange the snapshot image in a position not to obstruct the former still image from being viewed. Meanwhile, where there are plural underlying regions capable of encompassing a snapshot image, the region first found out is applicable or a background region may be selected which has the same area as the snapshot image.

(2) The snapshot image is arranged in a background region having the greatest area, out of underlying regions separated by the region-separating module 150. Namely, this is because the arrangement in the greatest one in area out of underlying region makes it easy to view in respect of design.

(3) The snapshot image is arranged in a united region (combined region) of a background region with a character region, having the smallest character size, out of the character regions separated by the region-separating module 150. Namely, the character region having the smallest character size is frequently not so significant in the document material. In the absence of a background region where the snap image can be contained, arrangement is by a superposition over the character area. Meanwhile, the combined region with a background region refers to a united region of a character region with a background region located around the relevant character region.

(4) The snapshot image is arranged in a region where the snapshot image can be encompassed, out of the combined regions of the underlying region with a character region separated by the region-separating module 150 and having a smaller character size than a specific size. Namely, for an area of a combined region of a background region with a character region having the smallest character size in the forgoing (3) case, it is effective for the case the snapshot image cannot be contained.

(5) The snapshot image is arranged such that it does not overlap with the character region having a character size greater than a specific size, out of character regions separated by the region-separating module 150. This is because that significant information is frequently described in a region having a greater character size conversely to the foregoing (3) and (4) cases, and hence the relevant region is required not to be hidden by the snapshot image.

(6) The snapshot image is arranged such that it does not overlap with a picture region, out of picture regions separated by the region-separating module 150. Namely, this is because the picture region frequently contains a great deal of information and hence the relevant region is required not to be hidden by the snapshot image.

(7) Where the snapshot image overlaps with the other region than a background region, the snapshot image is made semi-transparent. Namely, where the snapshot image is arranged in a character region, etc. that is other than a background region, the character region, etc. is made visible so that readability is not impaired.

(8) Where the snapshot image overlaps with the other region than a background region, the snapshot image is arranged in a top and bottom relationship such that the other region than the underlying region is on top of the snapshot image. Namely, where there is a top and bottom relationship in displaying images with superposition, readability is prevented from being impaired by putting, on top, the character region, etc. that is other than the underlying region. In this case, the snapshot image serves as a background region.

(9) Where the snapshot region overlaps with the other region than a background region, the snapshot image is arranged by allowing the operator to select a top and bottom relationship in a region the snapshot image overlaps with a still image (including a layer relationship to be handled in the graphic art). Namely, where there is a top and bottom relationship of images when displaying images with superposition, the operator is allowed to select a top and bottom relationship thereof, thus reflecting operator's intention and producing an image well in design.

(10) Where the snapshot region overlaps with other region than a background region, the snapshot image is arranged and reduced at a size-reduction ratio within a specific range. Namely, where the snapshot image is superposed over a character region other than a background region, the effect of superposition is reduced to a possible small extent.

(11) By displaying plural images each produced by arranging the snapshot image on the still image, selection is allowed from the plural images produced by operator's operation.

Namely, although there are various arrangement methods as mentioned above, such arrangement is made in plurality of times. By presenting an image obtained as a result of such arrangements, the operator is allowed to select thereof, thus reflecting operator's intention and selecting an image well in design.

(12) By producing an image the snapshot image is arranged on the still image and displaying the relevant image, the snapshot image is to be moved by operator's operation. Namely, by providing an edit function to the operator, an image can be produced with operator's intention reflected greater and well in design. Meanwhile, the arrangement of the snapshot image may be by the foregoing arrangement method.

The above arrangement methods are usable in various combinations.

The print-data producing module 160 is connected to the moving-image arranging module 140 and to the print module 170, to produce print data based on the still image that the snapshot image is arranged by the moving-image arranging module 140.

The print module 170 is connected to the print-data producing module 160, to make a printing of the print data produced by the print-data producing module 160 by use of the printer.

The operation/function is now explained by use of FIGS. 2 to 8.

Figure 2:
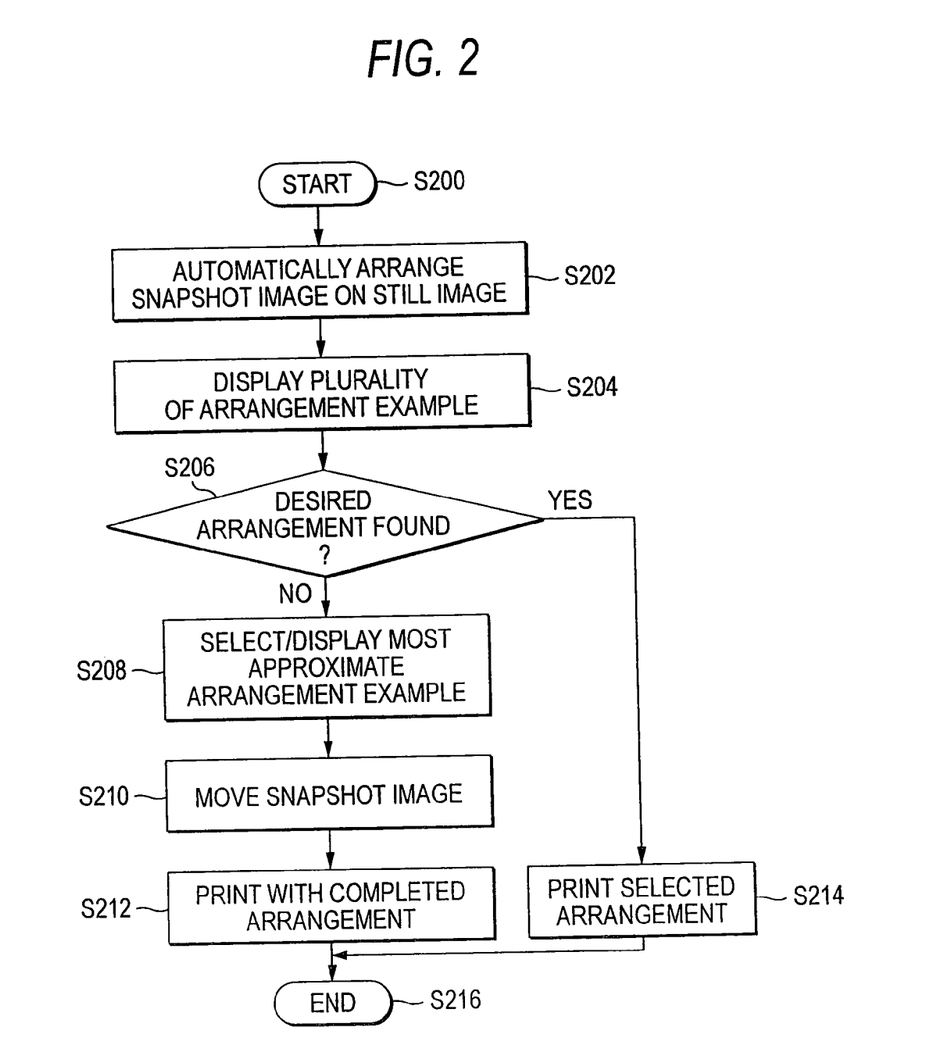
FIG. 2 is a flowchart exemplifying an overall processing.

Using a flowchart of FIG. 2, explanation is made on an exemplary overall processing according to the present embodiment.

At step S202, the moving-image arranging module 140 automatically arranges a snapshot image over a still image. Namely, produced are plural arrangement results by the moving-image arranging module 140.

At step S204, displayed is plural arrangement examples produced at the step S202 by means of the moving-image arranging module 140.

At step S206, the moving-image arranging module 140 inquires the operator whether "desired arrangement present?" If yes from operator's operation, the process proceeds to step S214. If no, the process proceeds to step S208.

At the step S208, selected is a nearest one to an arrangement image the operator desires. The moving-image arranging module 140 displays an image selected.

At step S210, the moving-image arranging module 140 causes the snapshot image without restriction, in accordance with operator's operation.

At step S212, in the case the operator completed the editing (including movement and editing a top and bottom relationship of images) on the snapshot image, an image completed edited is printed on the printer by the print module 170.

At step S214, because there is an arrangement the operator desires, an image with the selected arrangement is printed on the printer by means of the print-data producing module 160 and print module 170.

Figure 3:
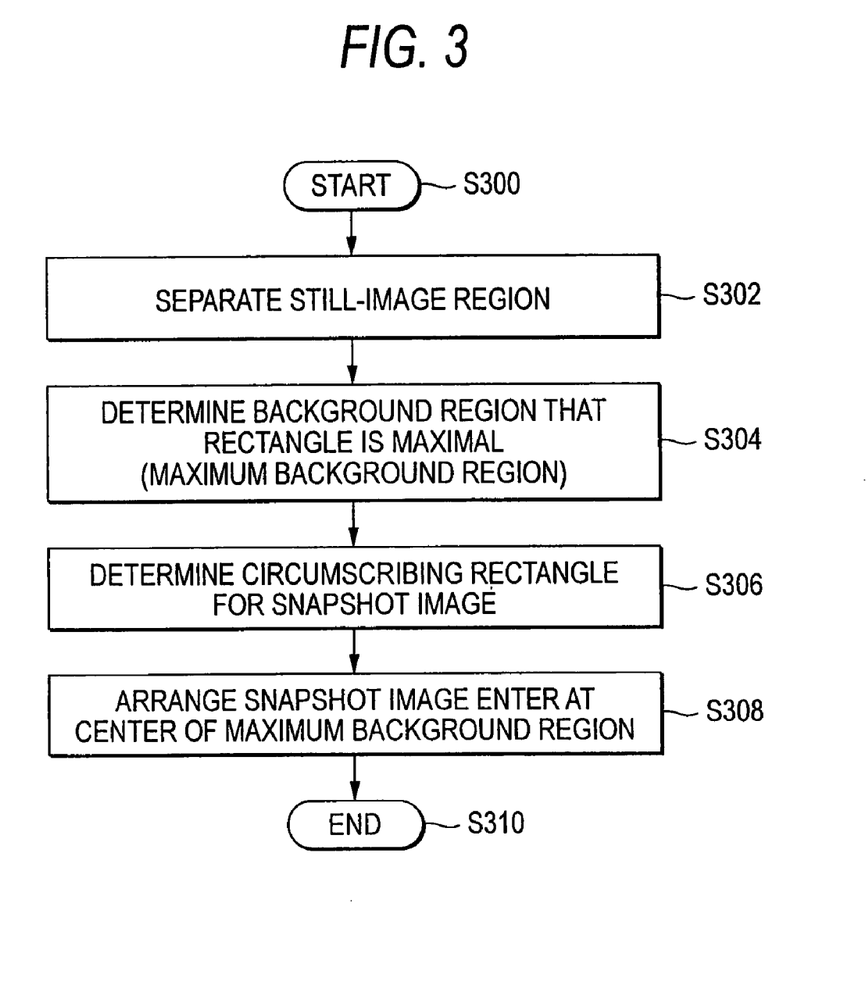
FIG. 3 is a flowchart exemplifying a processing to arrange a snapshot image on a background region having the maximum area.

Using a flowchart of FIG. 3, explanation is made on an exemplary processing for arranging the snapshot image in a background region having the maximum area.

At step S302, the region-separating module 150 separates the region constituting a still image.

Figure 7:
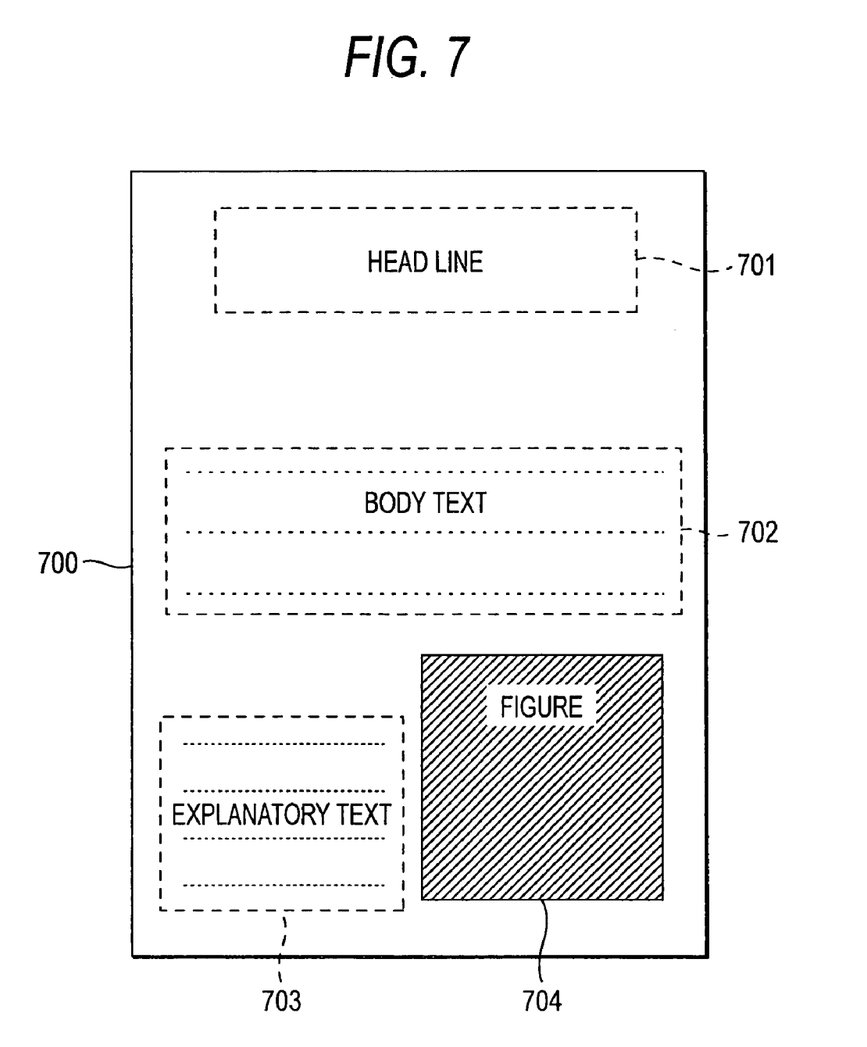
FIG. 7 is an explanatory figure showing an exemplary document material as a still image.

Here, explanation is made on a still image example by use of FIG. 7. A document material 700, as a still image, has a headline region 701, a body-text region 702, an explanatory-text region 703 and a figure region 704. Beside these regions, a background region is included. In FIG. 7, the underlying region is provided by a region lying between the headline region 701 and the body-text region 702 and between the body-text region 702 and the figure region 704.

Figure 6:
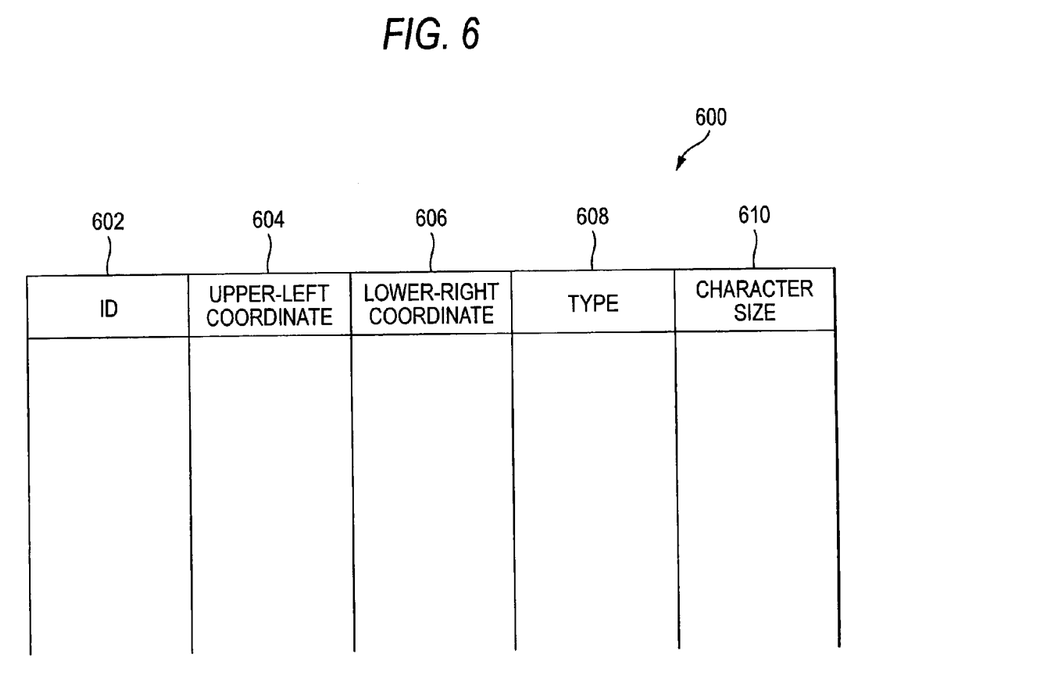
FIG. 6 is a figure explaining an exemplary data structure concerning a certain region obtained as a result of region separation process.

Using FIG. 6, explanation is made on an example of a data structure concerning a region obtained as a result of processing by the region-separating module 150. A region table 600 has an ID column 602, an upper-left coordinate column 604, a lower-right coordinate column 606, a type column 608 and a character size column 610. The ID column 602 is stored with an identifier that can identify unambiguously a region. The upper-left coordinate column 604 and the lower-right coordinate column 606 each is stored with a coordinate representing a position of a region within an image. Specifically, an X axis is taken vertically while a Y axis is taken horizontally in the image, to indicate a regional position by means of an X-Y coordinate. Besides, it may be a relative position information of between regions. The type column 608 is stored with a region type. The type refers to a region attribute, i.e. underlying region, character region, figure region, table region, photograph region or the like. The character-size column 610 is stored with an in-region character size if the region is a character region.

At step S304, the moving-image arranging module 140 determines a background region having a maximum area (hereinafter, referred to as the greatest underlying region) by looking up the region table 600 obtained as a result of region separation by the region-separating module 150.

At step S306, the moving-image arranging module 140 determines a circumscribing rectangle on the snapshot image (smallest rectangle capable of containing the snapshot).

At step S308, the moving-image arranging module 140 arranges the snapshot image at its center with a center of the greatest underlying region. This produces an image the snapshot image is arranged on the still image.

Figure 4:
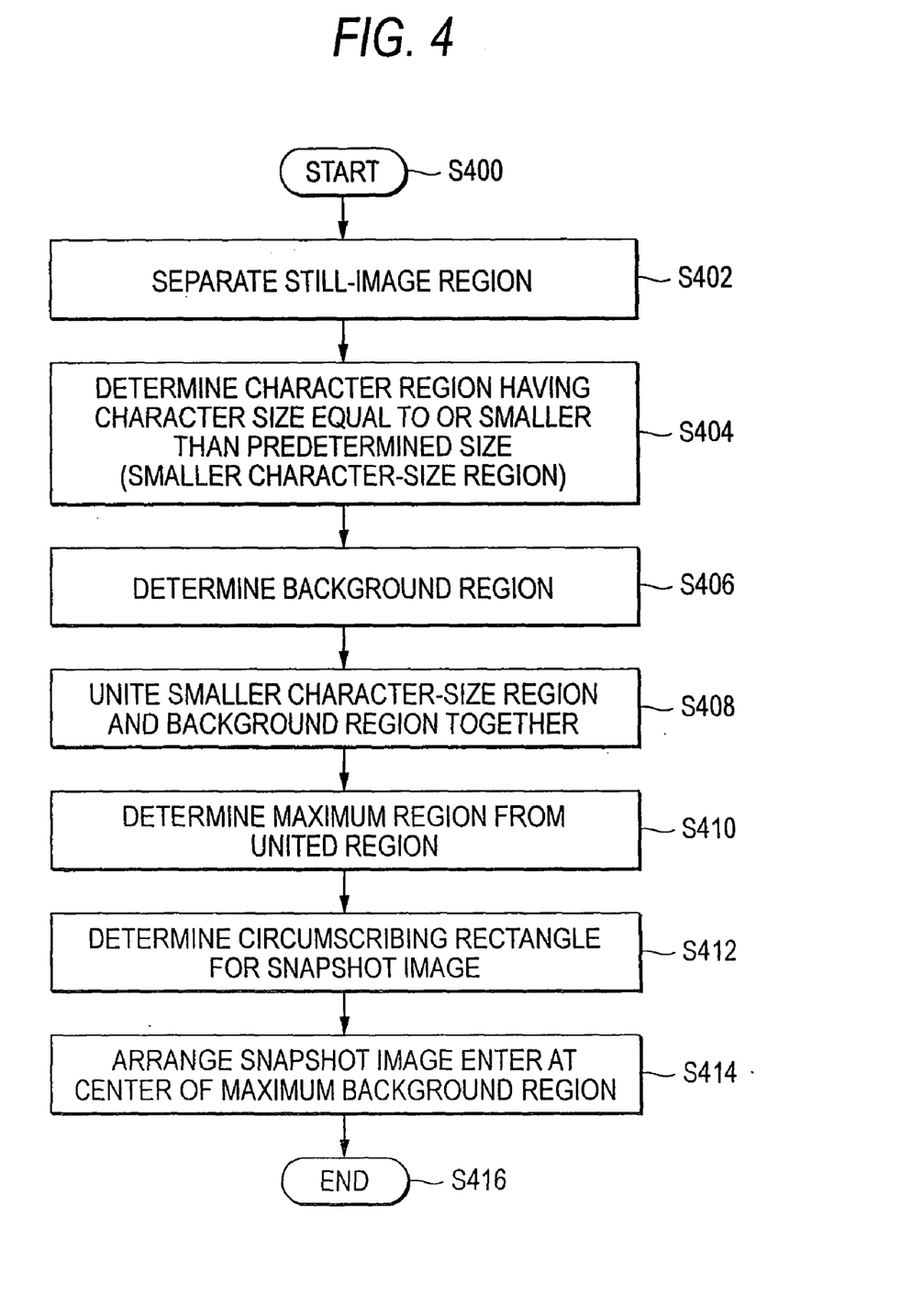
FIG. 4 is a flowchart exemplifying a processing to arrange a snapshot image on a character region having the smaller character size.

Using a flowchart of FIG. 4, explanation is made on an exemplary processing to arrange the snapshot image on a character region having a smaller character size.

The process at step S402 is similar to that of the FIG. 3 step S302.

At step S404, the moving-image arranging module 140 determines a character region having a character size equal to or smaller than a specific size (hereinafter, referred to as a smaller character size) by looking up the region table 600 obtained as a result of region separation by the region-separating module 150. Where there are plural character regions fallen under, determined are the plural regions that are smaller in character size.

At step S406, the moving-image arranging module 140 determines a background region existing around the smaller-character-size region by looking up the region table 600 obtained as a result of region separation by the region-separating module 150. Where there are plural smaller-character-size regions, determined are underlying regions respectively existing around those.

At step S408, the moving-image arranging module 140 unites the smaller-character-size region and the underlying region determined at the step S406 together. Namely, prepared is a greater region including the smaller-character-size region. However, where no underlying region exists in the neighborhood, a united region is provided by the smallercharacter-size region itself. Meanwhile, where there are plural smaller-character-size regions, produced are plural united regions.

At step S410, the moving-image arranging module 140 determines a united region having the greatest area out of the plural united regions.

The processing at step S412 is similar to that of FIG. 3 step S306.

At step S414, the moving-image arranging module 140 arranges the snapshot image at its center with the center of the united region greatest in area. This produces an image the snap image is arranged on the still image. In this case, the snapshot image may be arranged semi-transparent. Otherwise, where there is a top and bottom relationship in superposition, the snapshot image may be put in a background.

Figure 5:
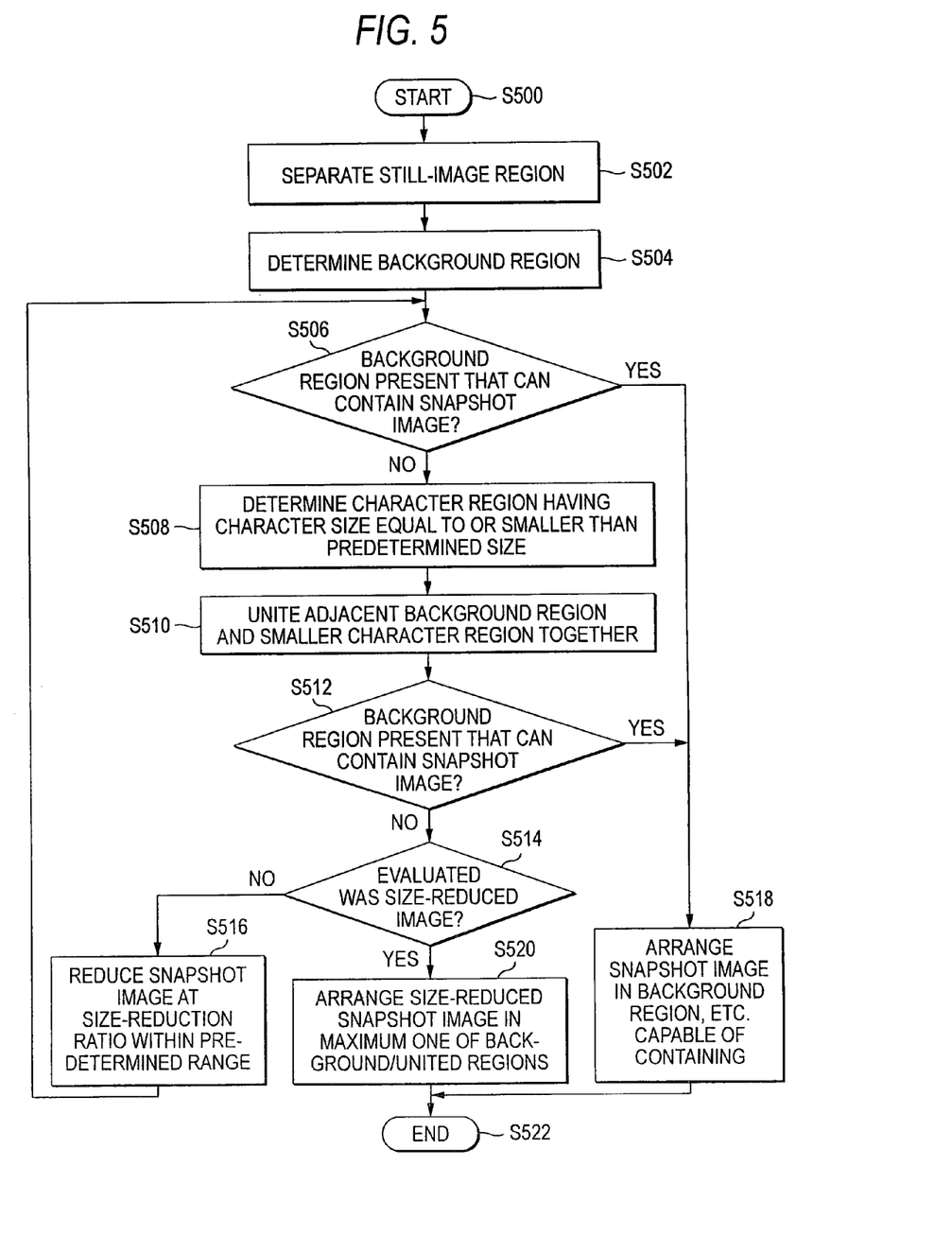
FIG. 5 is a flowchart exemplifying a processing where plural arrangement processes are combined together.

Using a flowchart of FIG. 5, explanation is made on an exemplary processing that plural arrangement processes are merged together.

The processing at step S502 is similar to that of FIG. 3 step S302.

At step S504, the moving-image arranging module 140 determines a background region by looking up the region table 600 obtained as a result of region separation by the region-separating module 150. In case there are plural underlying regions, determined are the plural underlying regions.

The processing at step S508 is similar to the processing of FIG. 4 step S404.

The processing at step S510 is similar to the processing of FIG. 4 step S408.

At step S512, the moving-image arranging module 140 determines whether there is a united region where the snapshot image can be contained. If yes in the determination, the process proceeds to step S518. If no, the process proceeds to step S514.

At the step S514, the moving-image arranging module 140 determines whether the snapshot image processed so far is a size-reduced image. If yes in the determination, the process proceeds to step S520. If no, the process proceeds to step S516. Note that size reduction may be done in plural stages. In such a case, the process of from step S506 to step S516 is repeated in a certain number of times. Meanwhile, determination may be depending upon size-reduction ratio, in order to go out of the loop. For example, size-reduction ratio may be changed at a 10% interval so that the step S520 is processed at a size-reduction ratio of 10% or smaller.

At step S516, the moving-image arranging module 140 size-reduces the snapshot image at a size-reduction ratio in a specific range. Then, the process returns to the step S506 process.

At step S518, the moving-image arranging module 140 arranges the snapshot image in a background region, where the snapshot image can be contained, determined at the step S506 or in a united region, where the snapshot image can be contained, determined at the step S512. Namely, the snap region is arranged such that its center is aligned with a center of the united region. This produces an image the snapshot image is arranged on a still image. In this case, the snapshot image may be arranged semi-transparent. Otherwise, where there is a top and bottom relationship in a superposition, the snapshot image may be put in a background.

At step S520, the size-reduced snapshot image is arranged in a greater one in area of the underlying region and the united region. Namely, the snapshot image is arranged such that its center is aligned with a center of the underlying or united region. This produces an image the snapshot image is arranged on a still image. In this case, the snapshot image is arranged semi-transparent. Otherwise, where there is a top and bottom relationship in a superposition, the snapshot image may be put in a background.

Figure 8:
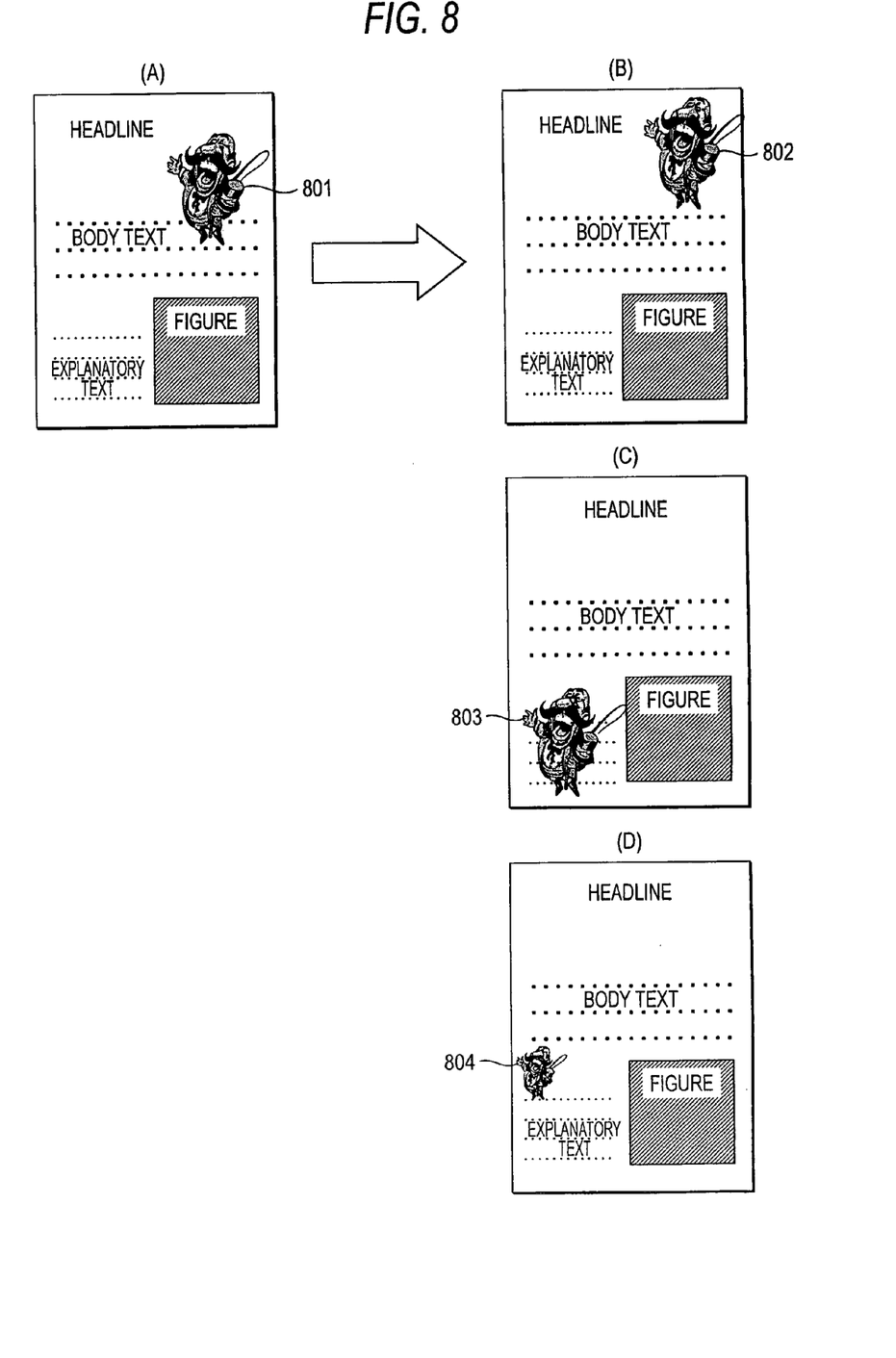
FIG. 8 is an explanatory figure showing exemplary cases where a snapshot image is arranged on a still image.

Using FIG. 8, explanation is made on an example that the snapshot image is arranged on a still image.

FIG. 8(A) shows a state that a moving image 801 is displayed moving over the FIG. 7 document material. It is assumed that the operator designated a snapshot in this state. Thereupon, the moving-image snapshot producing module 130 produces the moving image 801 at that instance thereof.

Then, the moving-image arranging module 140 arranges the snapshot images B, C, D (8-2, 803, 804) on the document material 700, as shown in FIGS. 8(B), 8(C) and 8(D). Namely, in FIG. 8(B), the snapshot image B is arranged on a greatest underlying region shown in the FIG. 3 flowchart. In FIG. 8(C), the snapshot image B is arranged on a united region of small-character-sized and underground regions, as shown in the FIG. 4 flowchart. In FIG. 8(D), the snapshot image B size-reduced is arranged on a background region, which is in the case determined yes at the step S506 after a size-reduction at the step S516 in the FIG. 5 flowchart.

Figure 9:
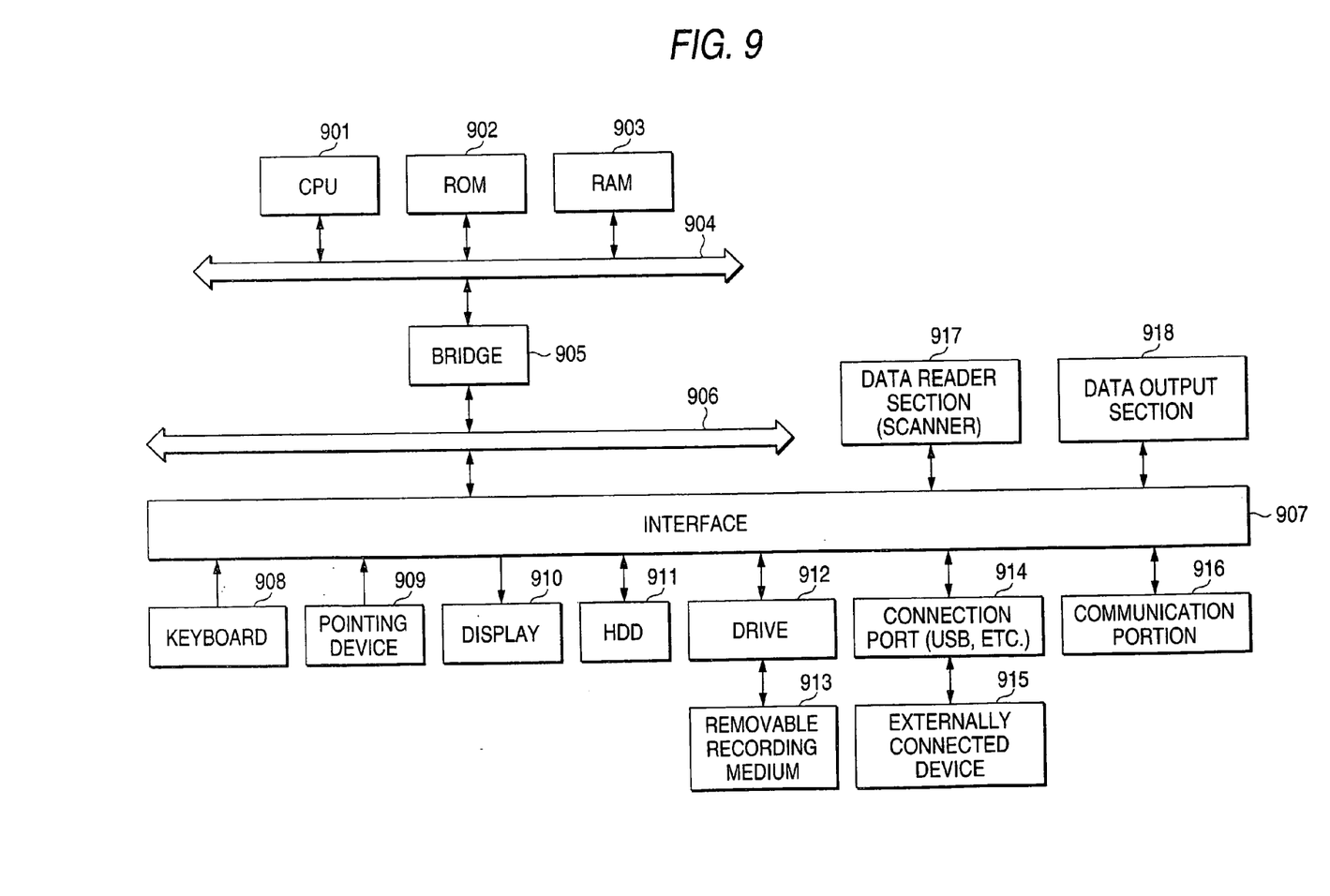
FIG. 9 is a block diagram showing an exemplary hardware configuration of a computer for realizing an exemplary embodiment of the invention.

Using FIG. 9, explanation is made on a hardware configuration example of an image processing system in the present embodiment. The configuration shown in FIG. 9 is of an image processing system provided, say, by a personal computer (PC) or the like, showing a hardware configuration example having a reader section 917, such as a scanner, and a data output section 918, such as a printer.

A CPU (central processing unit) 901 is a control section to execute a processing according to a computer program describing an execution sequence for the various modules explained in the embodiment, i.e. the snapshot designating module 120, the moving-image snapshot producing module 130, a moving-image arranging module 140 and the region-separating module 150.

A ROM (read only memory) 902 stores the programs, operation parameters, etc. the CPU 901 is to use. A RAM (random access memory) 903 stores the programs for the CPU 901 to execute, and the parameters, etc. to suitably change in the execution thereof. Those are connected to each other by a host bus 904 made by a CPU bus.

The host bus 904 is connected to an external bus, such as a PCI (peripheral component interconnect/interface).

A keyboard 908 and a pointing device 909, e.g. a mouse, are input devices for the operator to operate. A display 910 is made up by a liquid-crystal display or a CRT (cathode ray tube), to display various pieces of information as text or image information.

An HDD (hard disk drive) 911 incorporates therein and drives a hard disk, to record or reproduce the program or information for the CPU 901 to execute. The hard disk stores thereon an still image, a snapshot image and the like. Furthermore, it stores various computer programs including various data-processing programs.

A drive 912 reads out the data or program recorded on a removable recording medium 913 being loaded, such as a magnetic disk, an optical disk, a magneto-optical disk or a semiconductor memory, and supplies the data or program to the RAM 903 connected through an interface 907, an external bus 906, a bridge 905 and a host bus 904. The removable recording medium 913 is also usable as a data recording area similar to the hard disk.

A connection port 914, for connection with an externally connected device 915, has a connection such as of USB or IEEE1394. The connection port 914 is connected to the CPU 901, etc. by way of the interface 907, the external bus, the bridge 905, the host bus 904 and so on. A communicating section 916 is connected to a network, to execute a data communication with the external. The data reader section 917 is, say, a scanner, to execute a reading out of a document. The data output section 918 is, say, a printer, to execute an outputting of document data.

Note that the hardware configuration of the image processing system in FIG. 9 merely illustrates one configuration example. The image processing system in the embodiment is not limited to the FIG. 9 configuration but is satisfactorily in a configuration to execute the modules explained in the embodiment. For example, part of the modules may be configured by exclusive hardware (e.g. ASIC) or part of modules may be in a form provided within an external system and connected through a communication line. Furthermore, a plurality of the FIG. 9 systems may be connected one with another through communication lines, to operate in a mutual cooperative fashion. Otherwise, it may be built in a copier, a facsimile, a scanner, a printer or a composite machine (called also a multi-function copier having functions of scanner, printer, copier, facsimile, etc.).

In the embodiment, printing was illustrated based on the printer. Alternatively, display may be made on the display.

Meanwhile, although the region based on the region-separating module 150 is assumed rectangular, it may be in a free form. In such a case, the form is defined by use of a mask image.

Incidentally, the program explained is to be stored on a recording medium and the program can be provided by communication means. In such a case, the program explained can be grasped as an invention of "computer-readable recording medium recording a program".

The "computer-readable recording medium recording a program" refers to a program-recorded computer-readable recording medium that is to be used in program installation, execution and marketing.

Incidentally, the recording medium includes a digital versatile disk (DVD) "DVD-R, DVD-RW or DVD-RAM or the like" standardized under the DVD forum or "DVD+R, DVD+RW or the like" standardized under DVD+RW, a compact disk (CD) as a read only memory (CD-ROM), a CD recordable (CD-R) or a CD rewritable (CD-RW), a magneto-optical disk (MO), a flexible disk (FD), a magnetic tape, a hard disk, a read only memory (RON), an electrically erasable and rewritable read only memory (EEPROM), flash memory, and a random access memory (RAM).

The foregoing program or a part thereof is to be recorded on the recording medium and stored, marketed or so. Meanwhile, transmission is available by communications through use of a transmission medium of a wired or wireless network, e.g. a local area network (LAN), a metropolitan area network (MAN), a wide area network (WAN), the Internet, an intranet or an extranet, or a combination thereof. Meanwhile, it can be carried over a carrier wave.

Furthermore, the program may be a part of another program or be recorded together with a separate program on a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a display that displays a still image and a moving image to move over the still image, the still image including a document image having a character;
a snapshot image producing unit that produces a snapshot image of the moving image;
an arranging unit that arranges the snapshot image on the still image; and
a region separating unit that separates the still image into separate regions, the separate regions including a plurality of background regions and a plurality of character regions each including a character, and that determines a result, wherein the result includes the size of each said background region and the size of each said character region, wherein one of said plurality of character regions has a smallest character size, wherein the arranging unit arranges the snapshot image on the still image in accordance with the result of regional separation by the region separating unit; and
when none of said background regions are large enough to contain the snapshot image, the arranging unit arranges the snapshot image to overlap with the character region having the smallest character size.

2. The image processing system according to claim 1, wherein
the arranging unit arranging the snapshot image so that the snapshot image does not overlap with a character region of the plurality of character regions having a character size greater than a specific size among the plurality of character regions.

3. The image processing system according to claim 1, wherein
wherein the separate regions include a picture region including a picture; and
the arranging unit arranges the snapshot image so that the snapshot image does not overlap with the picture region.

4. The image processing system according to claim 1, wherein
the arranging unit makes the snapshot image semi-transparent in a case the snapshot image arranged overlaps with a region other than the background region.

5. The image processing system according to claim 1, wherein
the arranging unit arranges the snapshot image so that a region other than the background region overlaps with the snapshot image and is on top of the snapshot image.

6. The image processing system according to claim 1, wherein
the arranging unit arranges the snapshot image so that the snapshot image overlaps with a region other than the background region corresponding to a top and bottom relationship of the snapshot image and the region other than the background region being selectable.

7. The image processing system according to claim 1, wherein
the arranging unit produces a plurality of images each arranged with the snapshot image on the still image and provides a selecting section that selects one image from the plurality of images.

8. The image processing system according to claim 1, wherein
the arranging unit produces a composite image arranged with the snapshot image on the still image and provides a moving section that moves the snapshot on the composite image.

9. A method for processing an image comprising:
displaying a still image and a moving image to move over the still image, the still image including a document image having a character;
producing a snapshot image of the moving image;
arranging the snapshot image on the still image;
separating the still image into separate regions, the separate regions including a plurality of background regions and a plurality of character regions each including a character, and determining a result, wherein the result includes the size of each said background region and the size of each said character region, wherein one of said plurality of character regions has a smallest character size, wherein the arranging of the snapshot image on the still image is performed in accordance with the result of regional separation; and
when none of said background regions are large enough to contain the snapshot image, arranging the snapshot image to overlap with the character region having the smallest character size.

10. A non-transitory computer readable medium storing a program causing a computer to execute a process for processing an image, the process comprising:
displaying a still image and a moving image to move over the still image, the still image including a document image having a character;
producing a snapshot image of the moving image;
arranging the snapshot image on the still image;
separating the still image into separate regions, the separate regions including a plurality of background regions and a plurality of character regions each including a character, and determining a result, wherein the result includes the size of each said background region and the size of each said character region, wherein one of said plurality of character regions has a smallest character size, wherein the arranging of the snapshot image on the still image is performed in accordance with the result of regional separation; and
when none of said background regions are large enough to contain the snapshot image, arranging the snapshot image to overlap with the character region having the smallest character size.

11. An image processing system comprising:
a display that displays a still image and a moving image to move over the still image, the still image including a document image having a character;
a snapshot image producing unit that produces a snapshot image of the moving image;
an arranging unit that arranges the snapshot image on the still image; and
a region separating unit that separates the still image into separate regions, the separate regions including a plurality of background regions and a plurality of character regions each including a character, and that determines a result, wherein the result includes the size of each said background region and the size of each said character region, wherein one of said plurality of character regions has a smallest character size, wherein the arranging unit arranges the snapshot image on the still image in accordance with the result of regional separation by the region separating unit;
when none of said background regions are large enough to contain the snapshot image, the arranging unit arranges the snapshot image to overlap with the character region having the smallest character size; and
the region separating unit discriminates types of separate regions based on features of characters within the separated regions, the features of characters including size and form of a black-pixel cluster, black-pixel count in the separate regions and arrangement of black-pixel clusters.

* * * * *